(12) United States Patent
Yang et al.

(10) Patent No.: US 8,364,885 B2
(45) Date of Patent: Jan. 29, 2013

(54) SEMICONDUCTOR STORAGE SYSTEM FOR DECREASING PAGE COPY FREQUENCY AND CONTROLLING METHOD THEREOF

(75) Inventors: Wun Mo Yang, Gyeonggi-do (KR); Kyeong Rho Kim, Gyeonggi-do (KR); Jeong Soon Kwak, Gyeonggi-do (KR)

(73) Assignee: Hynix Semiconductor Inc., Gyeonggi-do (KR)

( * ) Notice: Subject to any disclaimer, the term of this patent is extended or adjusted under 35 U.S.C. 154(b) by 580 days.

(21) Appl. No.: 12/636,289

(22) Filed: Dec. 11, 2009

(65) Prior Publication Data

US 2011/0029749 A1  Feb. 3, 2011

(30) Foreign Application Priority Data

Jul. 29, 2009 (KR) ........................ 10-2009-0069607

(51) Int. Cl.
*G06F 12/00* (2006.01)
(52) U.S. Cl. ......... 711/103; 711/118; 711/165; 711/202
(58) Field of Classification Search ........................ None
See application file for complete search history.

(56) References Cited

U.S. PATENT DOCUMENTS

| | | | |
|---|---|---|---|
| 6,172,906 B1 | 1/2001 | Estakhri et al. |
| 6,598,115 B2 | 7/2003 | Kaki et al. |
| 6,763,440 B1 | 7/2004 | Traversat et al. |
| 7,424,498 B1 | 9/2008 | Patterson |
| 7,441,071 B2 | 10/2008 | Traister et al. |
| 7,444,461 B2 | 10/2008 | Traister et al. |
| 7,444,462 B2 | 10/2008 | Traister et al. |
| 7,444,463 B2 | 10/2008 | Gorobets |
| 7,451,168 B1 | 11/2008 | Patterson |
| 7,451,265 B2 | 11/2008 | Traister et al. |

FOREIGN PATENT DOCUMENTS

KR  10-0389867 B1  6/2003

*Primary Examiner* — Shawn X Gu
(74) *Attorney, Agent, or Firm* — Ladas & Parry LLP

(57) ABSTRACT

A semiconductor storage system includes a memory controller that classifies a memory block of a memory area into a data block and a buffer block. The buffer block corresponds to the data block. The memory controller compares the number of free pages of both the data block and the buffer block with the number of valid pages of the data block and the buffer block during mergence in order to select the merged target block. Depending on the result of the comparison, either the data block or the buffer block is selected as the merged target block.

18 Claims, 5 Drawing Sheets

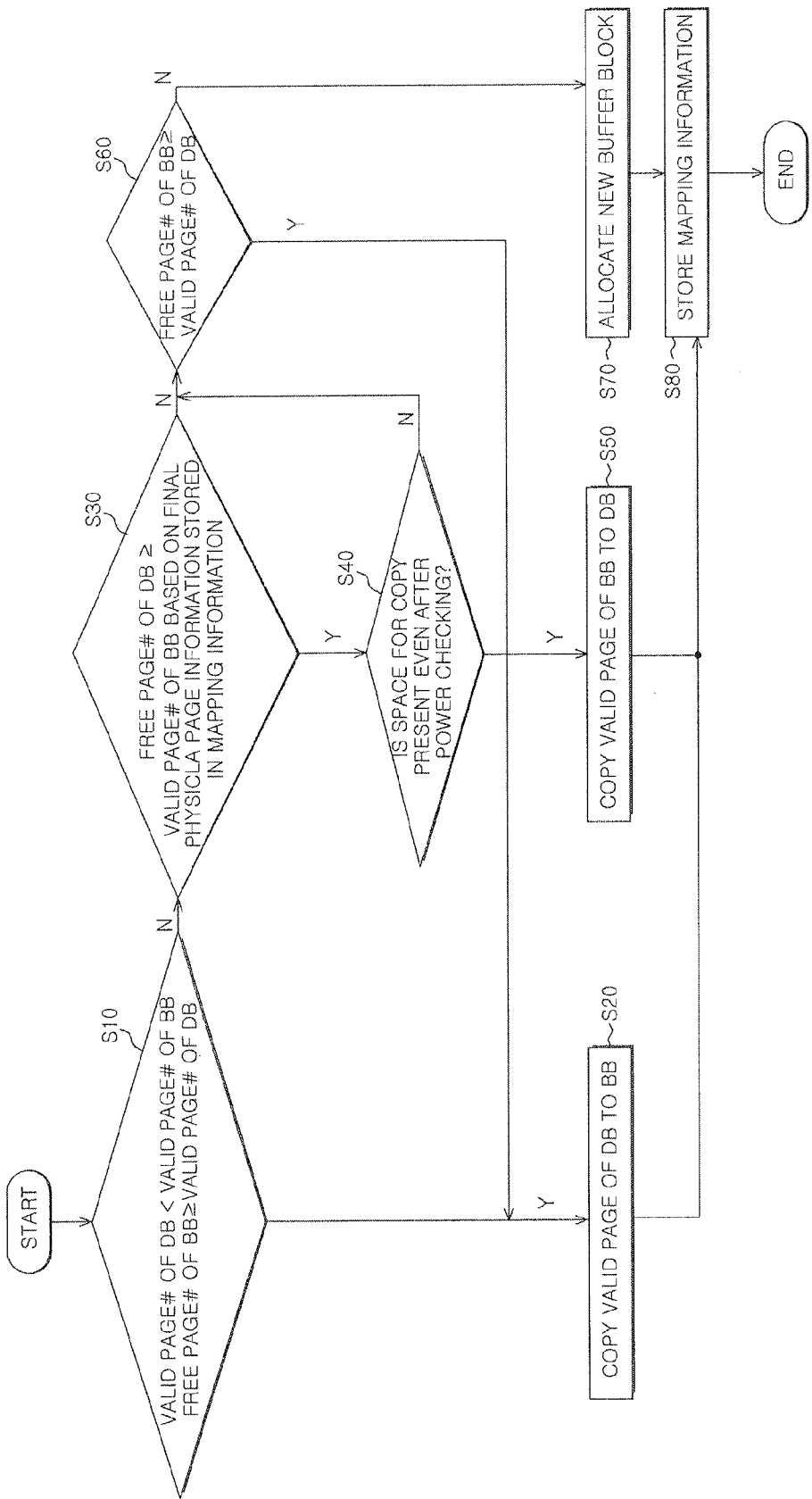

SEMICONDUCTOR STORAGE SYSTEM FOR DECREASING PAGE COPY FREQUENCY AND CONTROLLING METHOD THEREOF

CROSS-REFERENCES TO RELATED PATENT APPLICATION

The present application claims priority under 35 U.S.C 119(a) to Korean Application No. 10-2009-0069607, filed on Jul. 29, 2009, in the Korean Intellectual Property Office, which is incorporated herein by reference in its entirety as set forth in full.

BACKGROUND

1. Technical Field

The present invention relates generally to a semiconductor storage system and a controlling method thereof and, more particularly, to a semiconductor storage system controlling the merging of blocks and a controlling method thereof.

2. Related Art

In the recent years, the amount of data utilized by apparatuses has increased with the further development of multimedia technologies. In addition, different types of apparatuses that store multimedia data, other than a computer, have become more widely spread, e.g., a digital camera, a digital camcorder, a digital recorder, etc. As a result, an interest in a nonvolatile storage device that stores the multimedia data has increased. A representative example of such a nonvolatile storage device includes a NAND memory. As is well known in the industry, over the last few years, personal computers (PC) are being released having a solid state drive (SSD) using a NAND memory instead of a hard disk drive (HDD). It is expected that the increasing use of the SSD will rapidly encroach on the HDD market.

Generally, an address mapping method for a memory area of the semiconductor storage system such as a SSD includes a block unit mapping method, a page unit mapping method, and a hybrid mapping method, which uses both the block unit mapping method and the page unit mapping method. The block unit mapping method maps a physical block address and a logical block address. The page mapping method, which is referred to as sector mapping, is a method of mapping a physical page address and a logical sector address by preparing a mapping table in a unit of a page. When page mapping is performed, an actual page address of the NAND memory can be found by searching the mapping table and thereby achieve a high-speed operation. However, a mapping storage capacity that is required in the NAND memory is unavoidably increased due to the large size of the mapping table. The block mapping method, however, can reduce the mapping storage capacity required in comparison with the page mapping method since the block mapping method stores and uses tables corresponding to the number of blocks of the NAND memory in the NAND memory.

However, the block mapping method is inefficient for an overwrite process. The hybrid mapping method basically reduces the mapping storage capacity by using the block mapping method and uses the page mapping method with respect to a buffer block (alternatively, referred to as a log block). Herein, the mapping method that uses the buffer block primarily includes the page mapping method and the hybrid mapping method. For convenience, the hybrid mapping method will be primarily described.

The buffer block mapping method divides the memory block of the memory area into a data block and a buffer block. Data is stored by allocating the buffer block through mapping, preferably to the data block designated according to a logical address.

Therefore, when extra space of the buffer block mapped to the corresponding data block is insufficient in response to a write request of a host, despite the corresponding data block itself having sufficient extra space, a write operation is performed by allocating a new buffer block through a flash translation layer (FTL) algorithm. As such, the performance of block mergence or garbage collection may be deteriorated since a command for merging the data block into the corresponding mapped buffer block is always performed. As a result, more efficient block management is needed.

SUMMARY

A semiconductor storage system controlling mergence of blocks is disclosed herein.

A controlling method of a semiconductor storage system controlling mergence of blocks is also disclosed herein.

According to one embodiment of the present invention, a semiconductor storage system includes a memory controller that classifies a memory block of a memory area into a data block and a buffer block corresponding to the data block and compares the number of free pages with the number of effective pages of the data block and the buffer block during mergence to select the merged target block as the data block and the buffer block.

In another embodiment of the present invention, a semiconductor storage system includes a memory area configured to include including a data block and a buffer block corresponding to the data block; a buffer configured to temporarily store mapping information of the data block and the buffer block, and information on a program counter to return and a program register; and a memory area configured to include a memory controller that sets the data block as the target block of mergence when the number of free pages of the data block is equal to or larger than the number of valid pages of the buffer block by counting the number of free pages of the data block by using the storage result of the buffer during mergence.

In another embodiment of the present invention, a method for controlling a semiconductor storage system includes cross-comparing the number of valid pages of a data block, the number of valid pages of a buffer block, and the number of free pages of the buffer block during mergence; and performing the mergence by setting the buffer block as a target block of the mergence, setting the data block as the target block of the mergence, or setting a new buffer block other than the data block and the buffer block as the target block of the mergence in accordance with the comparison result.

These and other features, aspects, and embodiments are described below in the section "Detailed Description."

BRIEF DESCRIPTION OF THE DRAWINGS

Features, aspects, and embodiments are described in conjunction with the attached drawings herein, in which:

FIG. 7 is a flowchart showing a controlling method of a semiconductor storage system according to one embodiment of the present invention.

DETAILED DESCRIPTION

Hereinafter, a preferred embodiment of the present invention will be described with reference to the accompanying drawings.

First, in FIG. 1, a semiconductor storage system according to one embodiment of the present invention will be described.

Figure 1:
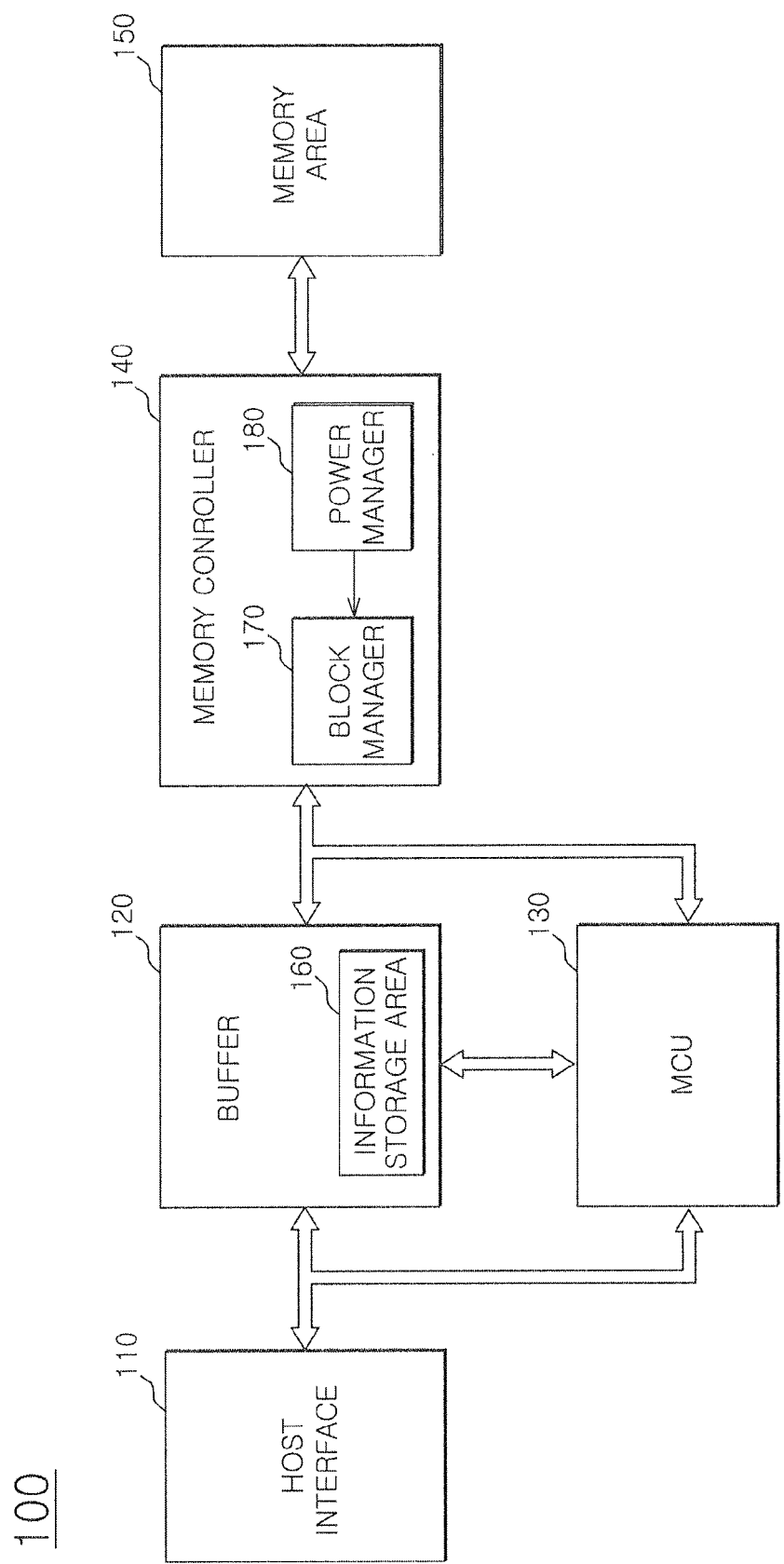
FIG. 1 is a block diagram showing an exemplary semiconductor storage system according to one embodiment of the present invention.
Figure 2:
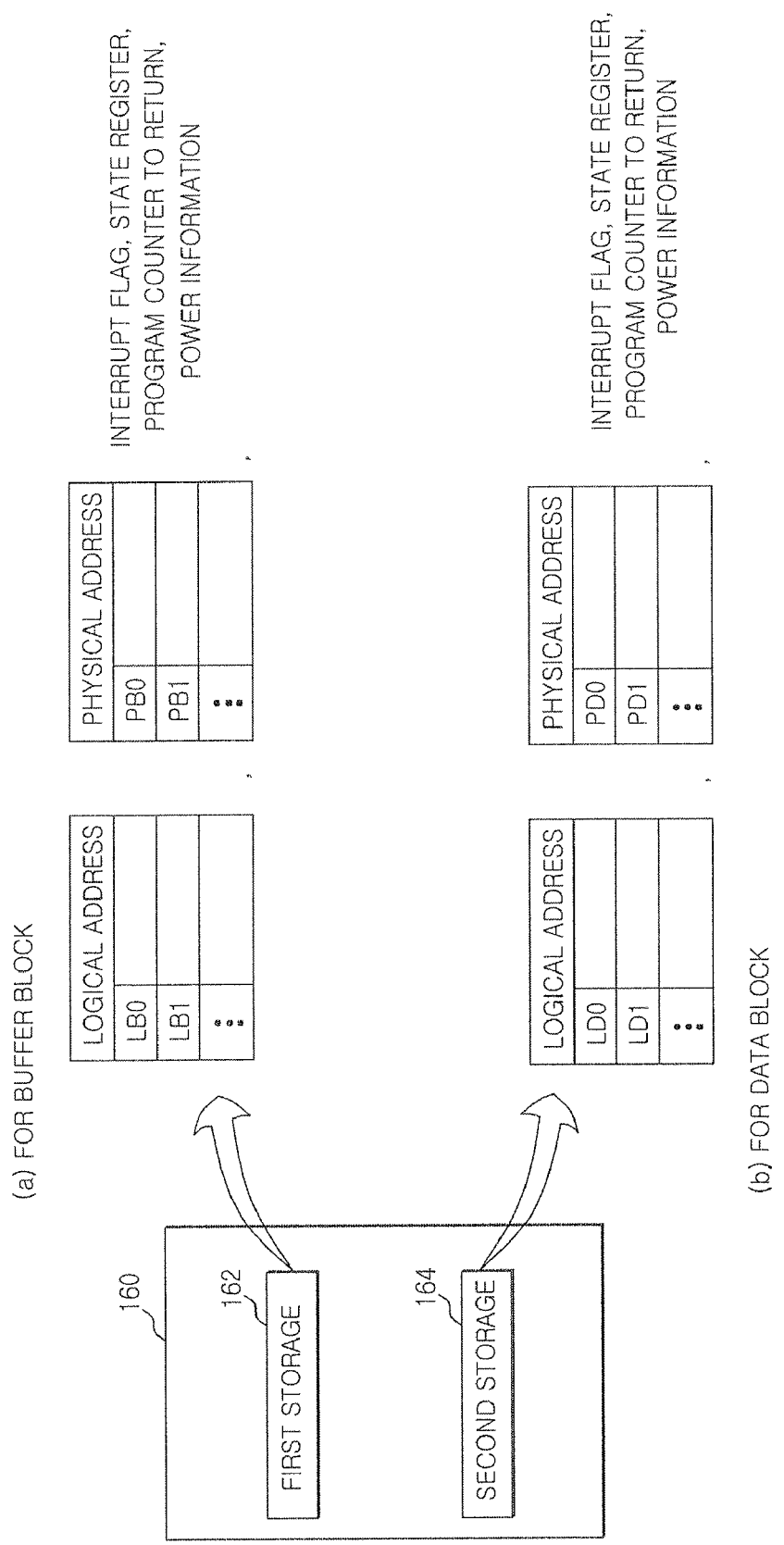
FIG. 2 is a conceptual block diagram showing an exemplary information storage area of FIG. 1 according to one embodiment of the present invention.

FIG. 1 is a block diagram showing an exemplary semiconductor storage system 100 according to one embodiment of the present invention and FIG. 2 is a conceptual block diagram showing an exemplary information storage area 160 of FIG. 1 according to one embodiment of the present invention. Herein, the semiconductor storage system 100 is exemplified as a system using a NAND memory.

In FIGS. 1 and 2, the semiconductor storage system 100 can be configured to include a host interface 110, a buffer 120, an MCU 130, a memory controller 140, and a memory area 150.

The host interface 110 is connected to the buffer 120. A control command, an address signal, and a data signal are transmitted and received between an external host (not shown) and the host interface 110. An interface scheme between the host interface 110 and the external host (not shown) may be any one of serial advanced technology attachment (SATA), parallel advanced technology attachment (PATA), SCSI, expressed card, and PCI-express schemes; however, the interface scheme is not limited only thereto.

According to one embodiment of the present invention, the buffer 120 can be configured to include the information storage area 160. Therefore, the buffer 120 can buffer output signals from the host interface 110 or buffer data from the memory area 150. Further, the buffer 120 can buffer output signals from the MCU 130 and provide the output signals to the host interface 110 and the memory controller 140. The buffer 120 is exemplified as a buffer using static random access memory (SRAM).

The information storage area 160, as shown in FIG. 2, can be configured to include a first storage 162 and a second storage 164.

The first storage 162, for the buffer block, can temporarily store logical address and physical address mapping tables, an interrupt flag, a status register, a program counter to return, etc. The second storage 164, for the data block, according to one embodiment of the present invention can store logical address and physical address mapping tables, an interrupt flag, a status register, a program counter to return, etc.

In a general semiconductor storage system, mapping information and control-related information for the buffer block are temporarily stored in the buffer 120, while mapping information for the data block is stored in memory only after final mergence. That is, according to the conventional semiconductor storage system, a buffer block is set as a new data block after completion of the mergence of the buffer blocks, such that data of the corresponding buffer block is stored in the memory. In other words, the buffer block, which is a merging target block, is processed as the data block. Updated mapping information for the processing is not stored in a temporary storage area (volatile memory), but rather a main memory cell.

However, according to one embodiment of the present invention, the semiconductor storage system temporarily stores the mapping information and control-related information for the data block in the second storage 164, like that of the buffer block. Therefore, the data block can be selected as not only a source block, but also the merging target block. The detailed description thereof will be described below.

The micro control unit (MCU) 130 can transmit and receive the control command, the address signal, the data signal, etc., between the host interfaces 110 or control the memory controller 140 by using the signals. The MCU 130 can also control address mapping of the memory area 150.

The memory controller 140 can select a predetermined NAND memory device (not shown) from a plurality of NAND memory devices (not shown) of the memory area 150 and can provide a write, erase, or read command. The memory controller 140 can be configured to include a block manager 170 and a power manager 180.

More specifically, the block manager 170 can manage mergence of blocks so as to write data with a type in which a low copy frequency is generated by comparing the number of valid pages that are present in the corresponding buffer block with the number of valid pages that are present in the data block or comparing the number of free pages that are present in the buffer block with the number of free pages that are present in the data block. That is, the block manager 170 according to one embodiment of the present invention can enable interactive data movement between the data block and the corresponding buffer block in contradistinction to a known unidirectional control that enables data to move only from the data block to the buffer block. Therefore, the block manger 170 can also manage the data block so as to interactively move data between the data block and the buffer block like the buffer block. That is, the block manager 170 can check the mapping table of the data block, the program counter, etc. for the data block and store them in the second storage 164.

The power manager 180 can check whether or not a power state of the semiconductor storage system has an error. Herein, the power manager 180 according to one embodiment of the present invention is configured to store information for checking whether or not there is a power state error with respect to the data block and the buffer block. Therefore, the power manager 180 provides the power error checking information of the corresponding block to the block manager 170 to accurately judge the number of free pages when merging the buffer block and the data block with each other.

In general, new data to be written to a page cannot overwrite data already written to the page in memory. New data can be recorded in the memory only after the block unit of data is completely erased.

That is, an erase-before-write operation must be performed due to the physical characteristic of the memory. Therefore, more time may be required with respect to for the same I/O operation in comparison with a hard disk, which can perform an overwrite operation to a sector. Further, when an erasing operation is performed approximately 100,000 times to a block of the memory, the erasing operation can no longer be performed. Therefore, the lifetime of the memory is effectively shortened due to the erasing operationmemory. Due to the characteristics of memory, when the write operation is performed to a predetermined sector of the memory, the write operation is performed memory by allocating a block that is empty or has a low erasing operation frequency. As described above, the algorithm is referred to as a flash translation layer (FTL).

The FTL maps a sector number of a file system, i.e., a logical sector number, with a sector number, i.e., a physical sector number, of the memory. The FTL algorithm should perform the erasing operation minimally and should not focus on any predetermined block.

Mapping used in the FTL algorithm can be classified into sector mapping, block mapping, and hybrid mapping. The sector mapping maps the physical sector and the logical sector by preparing the mapping table according to a sector unit. The block mapping maps the physical block and the logical block. The hybrid mapping uses both sector and block mappings to utilize the advantages of the two types of mappings. The mapping table is stored in a RAM of a controller. Further, each FTL algorithm internally includes a switch, merge, allocation operation, or the like as necessary in addition to the basic read/write/erase operations. Herein, the switch operation is an operation that erases an original block and changes a value of a block mapping table without changing the content of the block. The merge operation is an operation that copies the latest information from two blocks and writes the latest information to a new block. The two blocks used during mergence are erased after changing the mapping table according to the new block. The allocation operation is an operation that searches and returns an empty block when an empty block is required.

In the semiconductor storage system utilizing memory, when data that is already recorded in a page is changed, the new data is recorded in another page and the previous data in the page is managed as an invalid area. That is, the new data does not overwrite the data in the current page, but rather the new data is recorded in another page and the page with the old data is marked as an invalid area. As a result, a mergence or garbage collection process is required. During the garbage collection process, only a valid page in a predetermined block is copied to another block. The corresponding block is then erased so as to allow for the reuse of the valid page. In the related art, when an extra space of the buffer block allocated according to the mapping method of the data block is determined to be insufficient, a new buffer block is allocated. More simply, according to the related art, the mergence of corresponding data blocks can only be performed in the buffer block (including the newly allocated buffer block).

However, according to one embodiment of the present invention as described above, data can be moved to any one block having sufficient extra space by comparing the extra space of the data block and the corresponding buffer block. Therefore, it is possible to improve resource efficiency of the extra space and to improve mergence efficiency by decreasing a copy frequency during mergence.

The memory area 150 is controlled by the memory controller 140 to write, erase, and read data.

A memory block (not shown) in the memory area 150 can include the data block and the buffer block. Herein, the buffer block is a type of write buffer. For a write command, data to be stored in the data block is stored in the buffer block corresponding thereto.

Hereinafter, an operation of the semiconductor storage system according to one embodiment of the present invention will now be described with reference to FIGS. 3 to 6.

FIGS. 3 to 6 are conceptual diagrams showing a merging process of various data according to one embodiment of the present invention.

Figure 3:
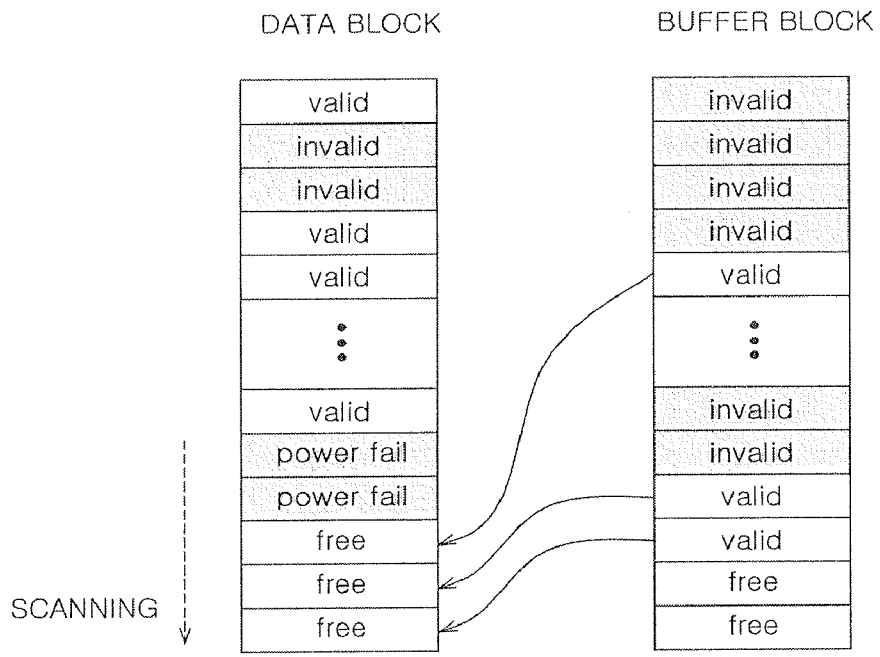
FIGS. 3 to 6 are conceptual block diagrams showing various embodiments of mergence of FIG. 1 according to one embodiment.

First, referring to FIG. 3, the number of valid pages of the buffer block is smaller than the number of valid pages of the data block and the number of free pages of the data block is larger than the number of valid pages of the buffer block.

EXPERIMENTAL EXAMPLE 1

First, it is shown that each of a data block and a buffer block includes a plurality of pages.

When a merging timing is reached, both valid pages of the data block and valid pages of the buffer block should be stored in one area.

In the related art, it is determined whether the valid page of the data block can first be stored in the free page of the buffer block. As described in Experimental Example 1, the number of valid pages of the data block is 4 and the number of free pages of the buffer block is 2. As a result, the valid pages of the data block cannot be stored in the free pages of the currently mapped buffer blocked according to the conventional art. Therefore, a new buffer block should be allocated according to the conventional art. Moreover, since information should be merged from two blocks (the data block and the buffer block mapped to the data block), a transmission time and a write time may increase according to the number of valid pages of each block. That is, in the related art, the merging of blocks takes a long time.

However, according to one embodiment of the present invention, the block manager (see 170 of FIG. 1) first compares the number of valid pages of the buffer block with the number of valid pages of the data block. Unlike the related art, the present invention scans the data block for determining valid pages. That is, referring to the information of the second storage area (see 164 of FIG. 2), the remaining pages of the data block are checked while the data block is scanned.

More specifically, the entire data block is not scanned, rather the corresponding data block is scanned according to information (i.e., program counter to return) for a page indicating where the last write command was performed in the data block. This information is used to scan and sum the remaining number of pages from the corresponding page to the last page. The remaining pages may include invalid pages.

Herein, the invalid pages include pages having a power failure error. Since the power manager (see 180 of FIG. 1) stores information about when a power failure is generated, it is possible to know which pages had a power failure while scanning. Therefore, since a page having a power failure is not suitable for storing the data, the page is set as an invalid area and is disabled so as not to be considered a free page of the corresponding data block.

In Experimental Example 1, the number of valid pages of the data block is 4 and the number of free pages of the buffer block is 2.

It is determined that any one block having a smaller number of valid pages serves as a mergence source block. The other block having a larger number of valid pages serves as a target block. The extra space of each block is determined according to the number of free pages.

In other words, the number of valid pages, i.e., pages of the data block to be stored as data is 4 and the number of free pages of the data block is 3.

Meanwhile, the number of valid pages of the buffer block mapped to the data block is 3 and the number of free pages is 2.

In this case, according to one embodiment of the present invention, the block manager (see 170 of FIG. 1) may consider merging the buffer block into the data block because the number of valid pages of the buffer block is smaller than the number of valid pages of the data block. For this operation, the number of free pages of the data block should be equal to or larger than the number of valid pages of the buffer block. Such a condition is satisfied, since the number of free pages of the data block is 3 in Experimental Example 1.

As a result, margining of the blocks can be completed by copying the 3 valid pages of the buffer block to the free page of the data block.

At this time, mapping information for the completed merged data block is stored in the memory area 150 of FIG. 1 by the block manager (see 170 of FIG. 1).

Figure 4:
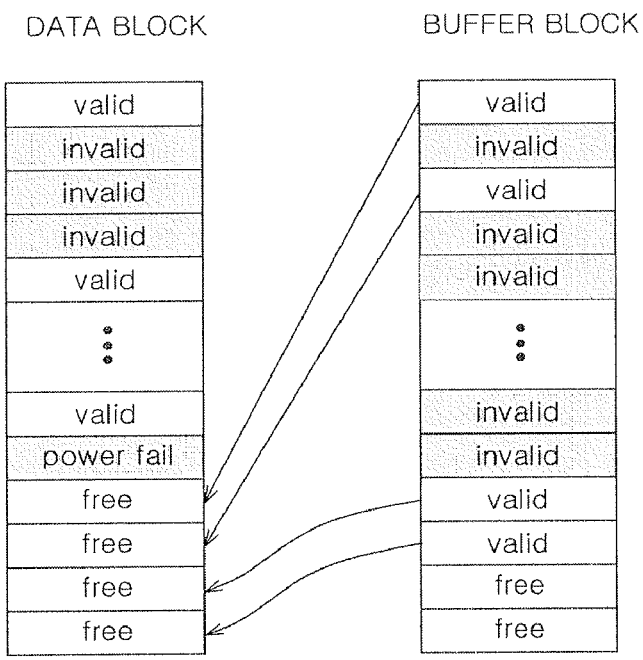

Next, referring to FIG. 4, the number of valid pages of the buffer block is larger than the number of valid pages of the data block, while the number of free pages of the data block is larger than the number of valid pages of the buffer block.

EXPERIMENTAL EXAMPLE 2

When the merging timing is reached, both the valid pages of the data block and the valid pages of the buffer block should be stored in one area similar to Experimental Example 1.

Likewise, the block manager (see 170 of FIG. 1) first compares the number of valid pages of the buffer block with the number of valid pages of the data block. As previously described above, scanning of the data block is also performed.

According to the scanning result, in Experimental Example 2, the number of valid pages of the data block is 3 and the number of valid pages of the buffer block is 4. However, since the number of free pages of the buffer block is 2, even though the number of valid pages of the data block is smaller than the number of valid pages of the buffer block, the valid pages of the data block cannot naturally be merged into the buffer block. That is, the buffer block has fewer free pages than the number of valid pages of the data block.

Meanwhile, the number of valid pages of the buffer block mapped with the data block is 4 and the number of free pages is 2.

In this case, even though the number of valid pages of the buffer block is larger than that of the data block, the valid pages of the buffer block may still be merged into the data block. That is, since the number of free pages of the data block is equal to the number of valid pages of the buffer block, the valid pages of the buffer block can be copied to the free pages of the data block.

In the related art, when the 3 valid pages of the data block cannot be copied to the buffer block, the merging of the blocks would be attempted by allocating a new buffer block. However, according to the present invention, when the data block is determined as having a larger extra space, i.e., free pages, the valid pages of the buffer block are copied and merged into the data block to decrease a copy frequency of the page.

At this time, the mapping information for the completed merged data block is stored in the memory area (see 150 of FIG. 1) by the block manager (see 170 of FIG. 1).

Figure 5:
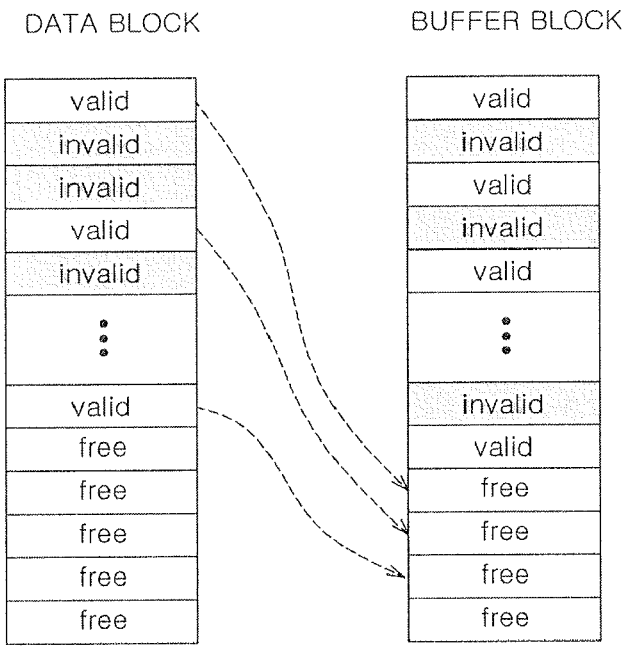

Referring to FIG. 5, the number of valid pages of the buffer block is larger than the number of valid pages of the data block, while the number of free pages of the data block is larger than the number of valid pages of the buffer block.

EXPERIMENTAL EXAMPLE 3

When the merging timing is reached, both the valid pages of the data block and the valid pages of the buffer block should be stored in one area similar to Experimental Examples 1 and 2.

Likewise, the block manager (see 170 of FIG. 1) first compares the number of valid pages of the buffer block with the number of valid pages of the data block. As previously described above, scanning of the data block is also performed.

According to the scanning result, in Experimental Example 3, the number of valid pages of the data block is 3 and the number of valid pages of the buffer block is 4. Further, the number of free pages of the data block is 5 and the number of free pages of the buffer block is 4. In this case, since the number of valid pages of the buffer block is 4 and the number of free pages of the data block is 5, the valid pages of the buffer block can be copied to the data block, but the copy frequency is smaller. At this time, it is determined whether the number of free pages of the buffer block is larger than the number of valid pages of the data block in order to copy the valid pages of the data block. In Experimental Example 3, the mergence of blocks can be completed with fewer copy operations, i.e., three, since the number of valid pages of the data block is smaller than the number of valid pages of the buffer block. That is, the block manager (see 170 of FIG. 1) may allow the data block to be used as the merged target block or allow the buffer block to be used as the target block as in the related art. A criterion for selecting the target merging block is based on the number of valid pages of each block and the existence and number of extra spaces, i.e., free pages, to which valid pages of a counterpart block can be copied.

Figure 6:
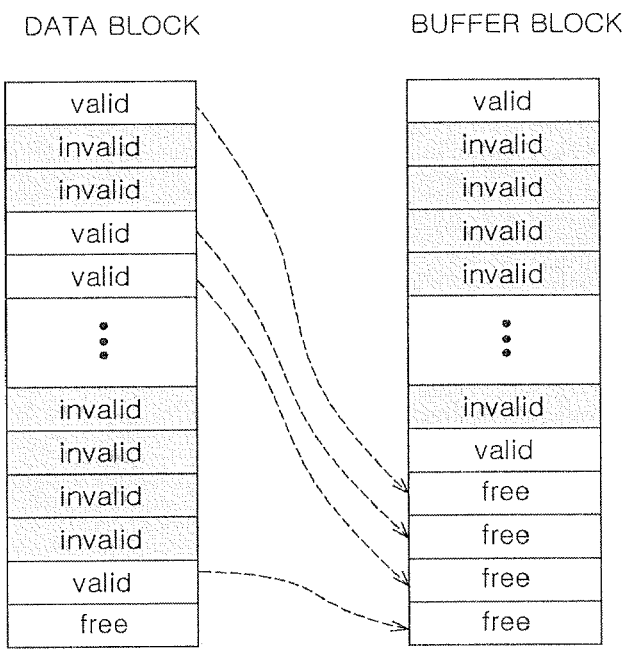

Referring to FIG. 6, the number of valid pages of the data block is larger than the number of valid pages of the buffer block, while the number of free pages of the data block is smaller than the number of valid pages of the buffer block.

EXPERIMENTAL EXAMPLE 4

According to a scanning result of the data block at the mergence timing, the number of valid pages is 4 and the number of free pages is 1. Meanwhile, the number of valid pages of the buffer block is 2 and the number of free pages is 4.

The number of free pages of each block is closely related to the number of valid pages of a counterpart block, which are related to each other through mapping.

That is, even though the number of valid pages of the data block is the greater, the valid pages of the buffer block cannot be merged to the data block because there is only a single free page in the data block as shown in FIG. 6.

In this case, the merging of the blocks can be completed by copying the 4 valid pages of the data block to the 4 free pages of the buffer block.

If a case other than the experimental examples provided above occurs, e.g., the number of valid pages of the data block is greater than the number of free pages of the buffer block and the number of valid pages of the buffer block is greater than the number of free pages of the data block, all the valid pages of the data block and the buffer block should be copied by allocating a new buffer block in the same manner as the related art.

FIG. 7 is a flowchart showing an operation of the semiconductor storage system of FIG. 1.

Referring back to FIGS. 1 to 7, when a mergence timing is reached, a block manager 170 compares the number of valid pages of a data block DB, the number of valid pages of a buffer block BB, and the number of free pages of the buffer block BB (S10) with each other.

That is, when the number of valid pages of the buffer block BB is larger than the number of valid pages of the data block DB and the number of free pages of the buffer block BB is equal to or larger than the number of valid pages of the data block (Y), the valid pages of the data block DB are copied to the buffer block BB (S20).

If as a result of the comparison, the number of valid pages of the buffer block BB is larger than the number of valid pages of the data block DB and the number of free pages of the buffer block BB is not equal to or larger than the number of valid pages of the data block, the conditions are compared with each other in detail again. That is, the number of free pages of the data block DB based on information for a last physical page stored in mapping information is checked as to whether the number is equal to or larger than the number of valid pages of the buffer block (S30).

In other words, it is determined whether the number of free pages remaining after scanning from the last physical page where a write command is performed with respect to the data block DB, which is stored in the mapping information, is equal to or larger than the number of valid pages of the buffer block BB. Therefore, when the number of remaining free pages of the data block DB is equal to or larger than the number of valid pages of the buffer block BB (Y), a power manager 180 checks whether a page has had a power failure and provides the result to the block manger 170. At this time, the block manager 170, as a result of the power failure checking, determines whether the number of pages having normal power, i.e., free pages of the data block DB, is equal to or larger than the number of valid pages of the buffer block BB (S40).

After checking the power, when the number of free pages of the data block DB is equal to or larger than the number of valid pages of the buffer block BB (Y), the valid pages of the buffer block BB are copied to the data block DB.

Meanwhile, when the number of free pages of the data block DB based on the information of the last physical page is not equal to or larger than the number of valid pages of the buffer block (N procedure of S30) or the number of free pages of the data block DB is smaller than the number of valid pages of the buffer block BB (N procedure of S40) as a result of checking the power, the number of free pages of the buffer block BB is compared with the number of valid pages of the data block DB (S60).

Therefore, when the number of free pages of the buffer block BB is equal to or larger than the number of valid pages of the data block DB (Y), merging of the blocks is performed by copying the valid pages of the data block DB to the buffer block BB (S20) because the buffer block BB has sufficient extra space.

However, when the number of free pages of the buffer block BB is smaller than the number of valid pages of the data block DB (N of S60), the merging of the blocks is performed by copying the valid pages of both the data block DB and the buffer block BB to a newly allocated new buffer block (S70) in the same manner as the related art.

Thereafter, when the mergence is completed, mapping information of the block where the mergence has occurred is updated and stored in the memory area 150 (S80).

As described above, according to an embodiment of the present invention, it is possible to reduce a copy frequency of pages when merging blocks by using a source data block as a merging target block without having to perform an operation in a buffer block for mergence as in the related art. Accordingly, it is possible to improve the performance of a semiconductor storage system since each block can be used evenly and in addition, a mergence time can be reduced.

While certain embodiments have been described above, it will be understood that the embodiments described are by way of example only. Accordingly, the device and the method described herein should not be limited based on the described embodiments. Rather, the devices and methods described herein should only be limited in light of the claims that follow when taken in conjunction with the above description and accompanying drawings.

What is claimed is:

1. A semiconductor storage system including a memory block of a flash memory area classified into a data block and a buffer block that corresponds to the data block for performing a mergence operation and writing information to a mergence target block, the semiconductor storage system, comprising;

a memory controller configured to compare a number of free pages of the data block and the buffer block with a number of valid pages of the data block and the buffer block during the mergence operation to select either the data block or the buffer block as the mergence target block.

2. The semiconductor storage system of claim 1, wherein the memory controller includes:

a block manager configured to count the number of valid pages that are present in the data block and the number of valid pages that are present in the corresponding buffer block and to count the number of free pages that are present in the data block and the number of free pages that are present in the corresponding buffer block and comparing counting results; and a power manager configured to provide a power failure result to the block manager after checking a power failure state of each page of the data block and the buffer block.

3. The semiconductor storage system of claim 2, wherein the block manager is configured to determine whether the number of valid pages of the data block is equal to or greater than the number of free pages of the buffer block and determine whether the number of valid pages of the buffer block is equal to or greater than the number of free pages of the data block to determine a mergence source block and the mergence target block.

4. The semiconductor storage system of claim 3, wherein the block manager is configured to count the number of free pages of each of the data block and the buffer block with respect to the power failure result of the power manager.

5. The semiconductor storage system of claim 3, wherein the block manager is configured to further allocate a new buffer block for mergence in addition to the data block and the buffer block according to each comparison result.

6. A semiconductor storage system for performing a mergence operation and writing information to a mergence target block, comprising:

a memory area configured to include a data block and a buffer block that corresponds to the data block;

a buffer configured to temporarily store mapping information of the data block and the buffer block, and information on a program counter to return and a program register; and a memory controller configured to set the data block as the mergence target block when a number of free pages of the data block is equal to or greater than a number of valid pages of the buffer block, wherein the number of free pages of the data block is calculated by using the mapping information in the buffer during the mergence operation.

7. The semiconductor storage system of claim 6, wherein the memory controller is configured to include:

a block manager configured to count a number of valid pages that are present in the data block and the number of valid pages that are present in the corresponding buffer block and to determine whether a number of free pages that are present in the corresponding buffer block is equal to or greater than the number of valid pages of the data block so as to control a copy operation frequency of the valid pages during mergence; and a power manager configured to provide a power failure result to the block manager after checking a power failure state of each page of the data block and the buffer block.

8. The semiconductor storage system of claim 7, wherein the block manager is configured to determine whether the number of valid pages of the data block is equal to or greater than the number of free pages of the buffer block and determine whether the number of valid pages of the buffer block is equal to or greater than the number of free pages of the data block to determine a mergence source block and the mergence target block.

9. The semiconductor storage system of claim 8, wherein the block manager is configured to copy the valid pages of the buffer block to the free pages of the data block by setting the buffer block as the mergence source block when the number of valid pages to be copied to the data block from the corresponding buffer block is smaller than a number of valid pages to be copied to the corresponding buffer block from the data block according to a comparison result of the block manager.

10. The semiconductor storage system of claim 8, wherein the block manager is configured to detect a page of the data block where a most recent write command of the data block was performed according to the mapping information in the buffer and counting the number of free pages of the data block by scanning remaining pages of the data block starting from the detected page.

11. The semiconductor storage system of claim 10, wherein the block manager is configured to exclude a page having a power failure according to the power failure result of the power manager so as to not count the page having a power failure as a free page when counting the number of free pages of the data block.

12. The semiconductor storage system of claim 8, wherein the block manager is configured to further allocate a new buffer block for mergence in addition to the data block and the buffer block in according to each comparison result.

13. The semiconductor storage system of claim 6, wherein updated mapping information for the mergence target block is stored in the memory area after the mergence operation.

14. A method for controlling a semiconductor storage system for performing a mergence operation and writing information to a mergence target block, comprising steps of:

comparing a number of valid pages of a data block, a number of valid pages of a buffer block, and a number of free pages of the buffer block during the mergence operation; and performing the mergence operation by setting the buffer block as the mergence target block, setting the data block as the mergence target block, or allocating and setting a new buffer block other than the data block and the buffer block as the mergence target block according to a comparison result.

15. The method for controlling a semiconductor storage system of claim 14, wherein the step of comparing is configured to determine whether the number of valid pages of the data block is larger than the number of valid pages of the buffer block and to determine whether a number of free pages of the data block is equal to or greater than the number of valid pages of the buffer block.

16. The method for controlling a semiconductor storage system of claim 15, wherein setting the data block as the mergence target block is configured to copy the valid pages of the buffer block to the data block when the number of valid pages of the data block is larger than the number of valid pages of the buffer block and the number of the free pages of the data block is equal to or greater than the number of valid pages of the buffer block according to the comparison result.

17. The method for controlling a semiconductor storage system of claim 15, wherein setting the data block as the mergence target block is configured to copy the valid pages of the buffer block to the data block when the number of valid pages of the data block is smaller than the number of valid pages of the buffer block, the number of free pages of the buffer block is smaller than the number of valid pages of the data block, and the number of free pages of the data block is equal to or greater than the number of valid pages of the buffer block according to the comparison result.

18. The method for controlling a semiconductor storage system of claim 15, wherein allocating and setting the new buffer block is performed when the number of free pages of the data block is smaller than the number of valid pages of the buffer block and the number of free pages of the buffer block is smaller than the number of valid pages of the data block according to the comparison result.

* * * * *